(12) United States Patent  
Sanborn et al.

(10) Patent No.: US 9,329,401 B2  
(45) Date of Patent: May 3, 2016

(54) VARIABLE POLARIZATION SEPARATION VIA BEAM SPLITTER ROTATION

(75) Inventors: Eric E. Sanborn, Blacksburg, VA (US); Mark E. Froggatt, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 20 days.

(21) Appl. No.: 14/119,797

(22) PCT Filed: May 21, 2012

(86) PCT No.: PCT/US2012/038771  
§ 371 (c)(1),  
(2), (4) Date: Nov. 22, 2013

(87) PCT Pub. No.: WO2012/162217  
PCT Pub. Date: Nov. 29, 2012

(65) Prior Publication Data  
US 2014/0078511 A1    Mar. 20, 2014

Related U.S. Application Data

(60) Provisional application No. 61/489,124, filed on May 23, 2011.

(51) Int. Cl.  
*G01B 9/02* (2006.01)  
*G02B 27/28* (2006.01)  
*G02B 6/27* (2006.01)  
*G01J 4/00* (2006.01)

(52) U.S. Cl.  
CPC .............. *G02B 27/283* (2013.01); *G01J 4/00* (2013.01); *G02B 6/2706* (2013.01)

(58) Field of Classification Search  
CPC ...... G01B 9/02; G01J 9/02; G01J 2009/0261; G01J 4/04; G01N 21/45  
USPC .......................................................... 356/491  
See application file for complete search history.

(56) References Cited

U.S. PATENT DOCUMENTS

| | | | |
|---|---|---|---|
| 4,742,286 A * | 5/1988 | Phillips | ......................... 318/640 |
| 4,793,678 A | 12/1988 | Matsumoto et al. | |
| 5,579,420 A | 11/1996 | Fukushima | |
| 5,724,165 A | 3/1998 | Wu | |
| 6,445,485 B1 | 9/2002 | Frigo et al. | |
| 2002/0008756 A1 * | 1/2002 | Hirooka et al. | ............... 347/246 |

(Continued)

FOREIGN PATENT DOCUMENTS

EP    0121369 A2    10/1984  
WO    WO 2010-051017    5/2010

OTHER PUBLICATIONS

International Search Report for PCT/US2012/038771, mailed Nov. 29, 2012.

(Continued)

*Primary Examiner* — Tarifur Chowdhury  
*Assistant Examiner* — Md M Rahman (57) ABSTRACT

An apparatus for separating polarization of light includes a rotatable beam splitter including an input for receiving light with a first polarization and an output for outputting light with a second polarization different from the first polarization. Rotation of the rotatable beam splitter changes the first polarization of the input light to the second polarization of the output light. An optical network and method are also set forth.

19 Claims, 5 Drawing Sheets

(56) References Cited

U.S. PATENT DOCUMENTS

| | | |
|---|---|---|
| 2003/0123370 A1 | 7/2003 | Nakao et al. |
| 2003/0147431 A1* | 8/2003 | Funakawa et al. ............... 372/20 |
| 2003/0223056 A1 | 12/2003 | Fu et al. |
| 2003/0223670 A1 | 12/2003 | Nikolov et al. |
| 2004/0047583 A1* | 3/2004 | Chiba et al. ................... 385/140 |
| 2005/0041290 A1 | 2/2005 | Du et al. |
| 2005/0174919 A1 | 8/2005 | Chang et al. |
| 2006/0098205 A1* | 5/2006 | Townley-Smith et al. .... 356/487 |
| 2009/0103100 A1* | 4/2009 | Froggatt et al. ............... 356/477 |
| 2009/0128878 A1* | 5/2009 | Jun et al. .................... 359/199.3 |
| 2009/0168137 A1 | 7/2009 | Wen et al. |
| 2010/0061730 A1 | 3/2010 | Seki et al. |
| 2010/0245691 A1* | 9/2010 | Kawamura ........................ 349/9 |
| 2011/0063616 A1 | 3/2011 | Wang |

OTHER PUBLICATIONS

Written Opinion for PCT/US2012/038771, mailed Nov. 29, 2012.
International Preliminary Report on Patentability dated Nov. 26, 2013 in International Application No. PCT/US2012/038771.
Extended European Search Report for Application No. EP20120789675, mailed on Jan. 26, 2015, 6 pages.

* cited by examiner

VARIABLE POLARIZATION SEPARATION VIA BEAM SPLITTER ROTATION

PRIORITY APPLICATION

This application is the U.S. national phase of International Application No. PCT/US2012/038771 filed 21 May 2012 which designated the U.S. and claims priority from U.S. provisional patent application Ser. No. 61/489,124, filed on May 23, 2011, the contents of which are incorporated by reference.

TECHNICAL FIELD

The technology relates to polarization control and may be used for example in optical fiber applications.

INTRODUCTION

Controlling the polarization state of light in an optical fiber is often required in optical fiber networks. Polarization control allows tasks such as alignment of fiber optic networks, balancing of power between a set of optical detectors, and probing a device under test with different launch polarization states to be performed. The polarization response of an optical network can be monitored using an industry technique known as polarization diverse detection where the polarization response of the light is split into one or more states and detected at respective optical detectors. Adding a polarization controller into this scheme permits monitoring of the polarization response of the optical network. In other words, as the input polarization is varied by a polarization controller, the response of the fiber can be separated and detected to gain insight to the polarization response of the optical network. Thus, it is common in optical fiber applications to both control the polarization at a point in an optical network and separate the response of the optical fiber into separate polarization states.

Polarization control can be performed by inducing a phase shift between light transmitted along the fast and slow axis in an optical fiber. Applying the phase shift in a controlled manner permits predictable control of the output polarization of the transmitted light. This can be done with fiber retarders in which a phase shift is induced by a birefringent material. An example of a fiber retarder is an optical waveplate. A quarter waveplate converts circular polarized light into linearly polarized light while a half waveplate can change the polarization direction of linearly polarized light. Waveplates can be constructed with various materials, or they can be simulated by placing fiber in a loop polarization controller. A waveplate within a loop polarization controller is often referred to as a "paddle."

A loop polarization controller uses the strain induced by bending the fiber to provide polarization control. Strain deforms the fiber, and the length that light must travel along a transmission axis varies. Hence, bending an optical fiber induces a phase shift between the transmission axes of the optical fiber, similar to a fiber retarder. The amount of phase shift accumulated between the two transmission axes for a bend of a given diameter may be determined based on the diameter of the optical fiber and the wavelength of the light. The number of loops that the fiber is bent at that diameter may be increased in order to increase the accumulated phase shift. Thus, within a "paddle" of the loop polarization controller, several loops of fiber may exist.

Figure 1:
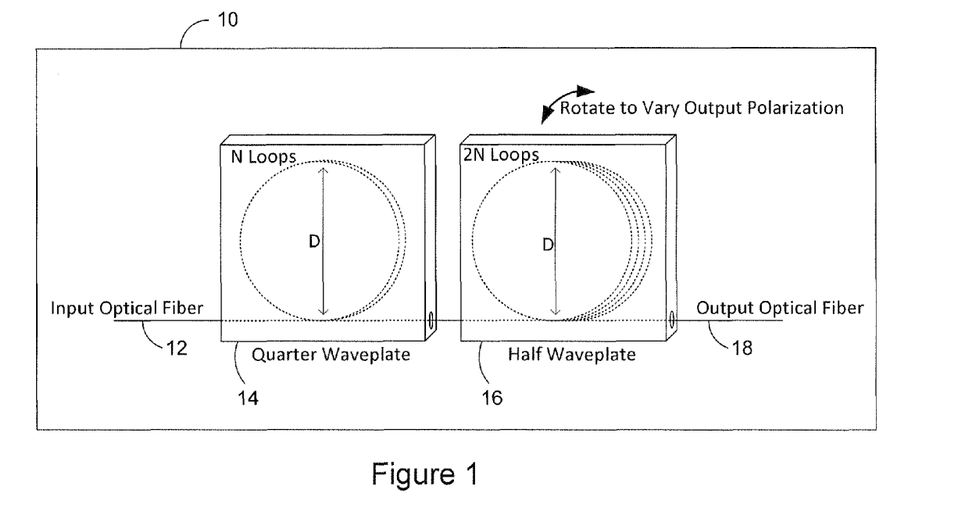
FIG. 1 shows an example polarization controller with two paddles.

To provide a polarization rotator, a bend diameter and a number of loops are calculated to generate a first quarter waveplate/first paddle to transform the light into linear polarized light. Then the number of loops may be doubled in a second paddle to generate a half waveplate that rotates the polarized light. The position of the second paddle is thus changed in order to vary the rotation of the transmitted light. FIG. 1 shows an example polarization controller 10 with two paddles 14 and 16. An input optical fiber 12 directs light to a quarter waveplate 14 formed from N fiber loops having a diameter D, with N being a positive integer. The phase shift induced in a paddle/waveplate is controlled by the number of loops at a given diameter. The output of the quarter waveplate 14 is provided to a half waveplate 16 that includes 2N fiber loops with diameter D. The position of the half waveplate 16 is rotated to vary the output polarization of the light carried by output fiber 18.

Greater levels of polarization control can be achieved by adding a third control paddle in a quarter waveplate configuration to the example scheme shown in FIG. 1. A three paddle device can achieve any arbitrary polarization state from any incident polarization state by adjusting the paddles. Other approaches exist for polarization control in fiber optics such generating multiple effective waveplates by applying pressure to the fiber with piezoelectric actuators.

But the inventors recognized that not all applications require full control of the polarization state in the optical fiber. For example, consider the case in which the polarization response of the optical network is required to be measured. A polarization diverse detection scheme is implemented in which light from a single optical fiber is split between two optical detectors. Standard optical fiber can transmit light along two principle axis designated as a fast (P) axis and a slow (S) axis. By splitting light to two optical detectors, an S detector and a P detector, the response of light transmitted along both of these axes may be monitored. This may be done using a polarization beam splitter (PBS) placed before the optical detectors. A PBS is composed of a birefringent crystal, where one axis of the crystal has a different index of refraction compared to the other axis of the crystal. Incident light is bent depending on which axis of the crystal it is incident.

Figure 2:
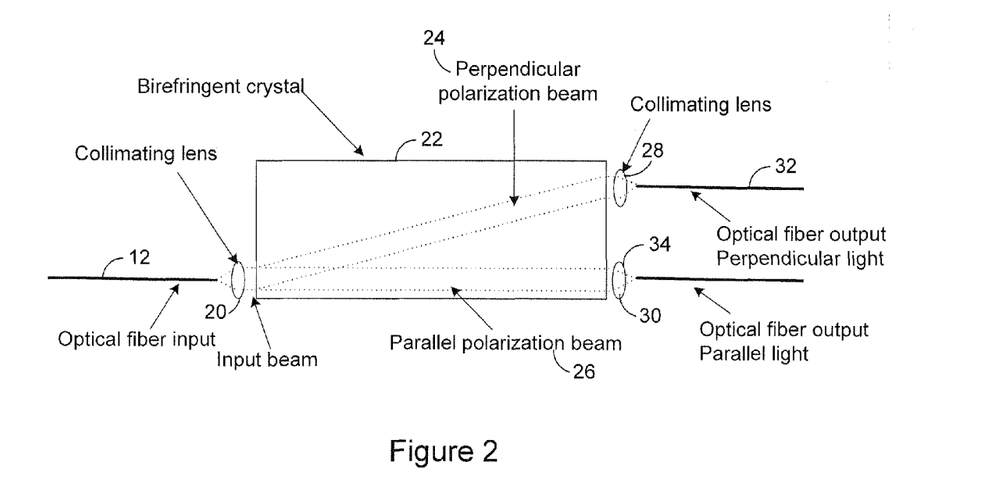
FIG. 2 depicts an example polarization beam splitter (PBS)

FIG. 2 depicts an example polarization beam splitter. An optical fiber 12 inputs light via a collimating lens 20 to a birefringent crystal 22. A perpendicular polarization beam 24 is collimated by collimating lens 28 into output fiber 32, and a parallel polarization beam 26 is collimated by collimating lens 30 into output fiber 34.

Figure 3:
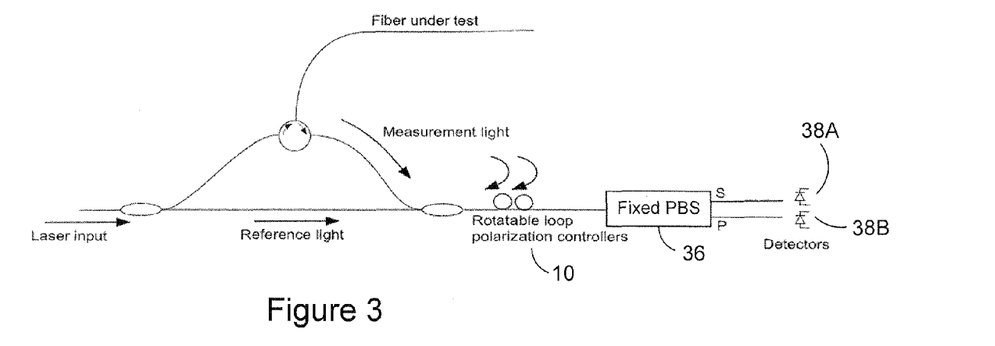
FIG. 3 shows an example polarization beam splitter used in an optical network.

When implementing a polarization beam splitter (PBS) into an optical network, like the example shown in FIG. 3, light is split based on the orientation of the fast axis and the slow axis of the optical fiber with respect to the parallel and perpendicular axis of the birefringent crystal in the fixed PBS 36. A polarization controller 10 is often desired to reorient the response of the fiber to the PBS. In the example shown in FIG. 3, the polarization controller 10 is a loop type polarization controller with two loops, and the perpendicular light is detected using an S photodetector 38A and a P photodetector 38B.

Although a two loop polarization controller can be used to achieve polarization rotation about an axis, or even more sophisticated solutions can be used, these conventional approaches to polarization control suffer several disadvantages. For example, since standard single mode fiber suffers loss when bent tightly, the two loop paddles must either be large or use low bend loss fiber. Even with low bend loss fiber, each loop requires a minimum diameter based on the mechanical strength of the fiber in bending. So polarization controllers can be larger than desired. The large size issue is compounded by the fact that paddles also rotate on an edge so that the swept area during rotation is large, thereby necessitating a large enclosure for this kind of polarization control product. A minimum of two paddles is required when balancing power between two output detectors; three are required to produce all polarization states. This requires additional axis of motion for automated solutions further adding to size, but also adding to cost and complexity. Polarization control can also be achieved by pinching the fiber using piezo driven assemblies. Although these devices can be smaller than the conventional paddle-based polarization controllers, they are costly and require special high voltage power supplies.

What is needed is technology that overcomes these limitations and provides for a less complex, less expensive, and smaller size polarization control that still provides polarization diverse detection.

SUMMARY

An apparatus for separating polarization of light includes a rotatable beam splitter including an input for receiving light with a first polarization and an output for outputting light with a second polarization different from the first polarization. Rotation of the rotatable beam splitter changes the first polarization of the input light to the second polarization of the output light. The rotatable beam splitter may be configured for manual rotation and/or automatic rotation. In the latter case, a beam splitter rotator controller may be provided to controllably rotate the rotatable beam splitter.

In one example embodiment, the rotatable beam splitter includes a gear assembly and an electric motor. A motor controller may be configured to control an amount of rotation of the rotatable beam splitter based on current drawn by the electric motor.

In another example embodiment, the rotatable beam splitter includes a rotation limiter. The rotation limiter may further be configured to progressively stop rotation of the rotatable beam splitter. Example rotation limiters include a spring, one or more limit switches, a magnet and one or more Hall effect sensors, etc.

The rotatable beam splitter outputs light with two different polarization states. In an embodiment where the rotatable beam splitter includes a gearbox assembly operable by an electric motor and a motor controller configured to detect motor power levels associated with power levels associated with the polarization states, the motor controller may be configured to control an amount of rotation of the rotatable beam splitter based on the detected power levels. An example first polarization is a parallel polarization and an example second polarization is a perpendicular polarization. An example change in polarization is a rotation of the polarization.

In one example implementation, the rotatable beam splitter is a birefringent crystal having an X axis perpendicular to a Y axis such that the rotatable beam splitter is rotatable to a first position to align the X axis with the parallel polarization and the Y axis with the perpendicular polarization and rotatable to a second position to align the Y axis with the parallel polarization and the X axis with the perpendicular polarization.

Another aspect of the technology relates to an optical network that includes an interferometer for mixing input light from a laser and light from a device or fiber under test and generating an interferometric light signal. A rotatable beam splitter in the network is configured to receive the interferometric light signal with a first light polarization and output light with a second light polarization different from the first light polarization. Rotation of the rotatable beam splitter changes the first light polarization to the second light polarization. Preferably, the rotatable beam splitter is configured to perform a polarization rotation operation without using a paddle-based polarization controller.

In an example embodiment of the optical network, the first light polarization is a parallel polarization, the second light polarization is a perpendicular polarization, and the rotatable beam splitter is a birefringent crystal having an X axis perpendicular to a Y axis such that the rotatable beam splitter is rotatable to a first position to align the X axis with the parallel polarization and the Y axis with the perpendicular polarization and rotatable to a second position to align the Y axis with the parallel polarization and the X axis with the perpendicular polarization.

Another aspect of the technology relates to a method for controlling polarization of an input light signal with a first light polarization. The method includes:
rotating a rotatable beam splitter to cause polarization rotation to a second light polarization (the rotating may be performed manually and/or automatically);
receiving the input light signal at the rotatable beam splitter; and
outputting from the rotatable beam splitter light with the second light polarization.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The polarization control technology described here provides a low cost, low complexity, and small size way to rotate the polarization of light and at the same time ensure that the optical power between S and P channels in a polarization diverse detection scheme is balanced. This new technology does so without the use of paddle polarization controllers or piezoelectric devices and only requires one degree of freedom for full polarization power balancing capability. In contrast to conventional polarization control mechanisms where a rotated polarization state is achieved by rotation with respect to a fixed beam splitter, the inventors discovered that rotational polarization control may be obtained in a more advantageous way by rotating a beam splitter with respect to the fast axis and the slow axis of the optical fiber.

Figure 4:
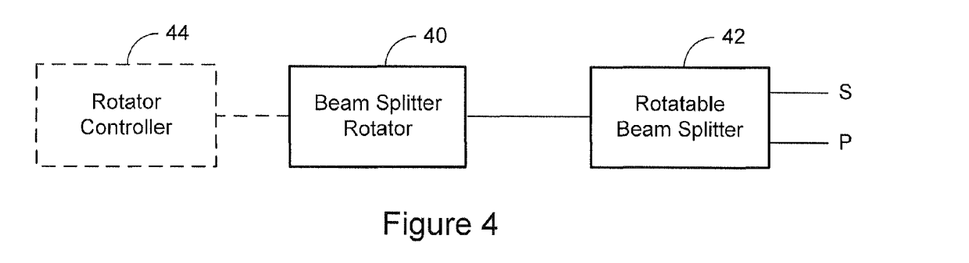
FIG. 4 shows an example rotatable beam splitter to achieve polarization control in accordance with a first example embodiment.

FIG. 4 shows an example rotatable beam splitter to achieve polarization control in accordance with a first example embodiment. A rotatable beam splitter 42 is rotated by a beam splitter rotator 40. By rotating the rotatable beam splitter 42, the optical power traveling to the S and P polarization output fibers can be changed. The beam splitter rotator 40 may be implemented manually or automatically. For manual rotation, a human may rotate the rotatable beam splitter 42, and in that case, the rotatable beam splitter 42 includes some structure that may be manipulated by the human to effect the rotation. Automatic rotation may, for example, be accomplished by a motor in which case it may be desirable to also use a suitable rotator controller 44. (Dashed lines are used to indicate that the rotator controller 44 is optional). For example, if the beam splitter rotator 40 uses an electric motor, the rotator controller 44 may be an electric motor controller. Other types of motors may be used. Indeed, any type of beam splitter rotator 40 technique or mechanism may be used.

Figure 5A:
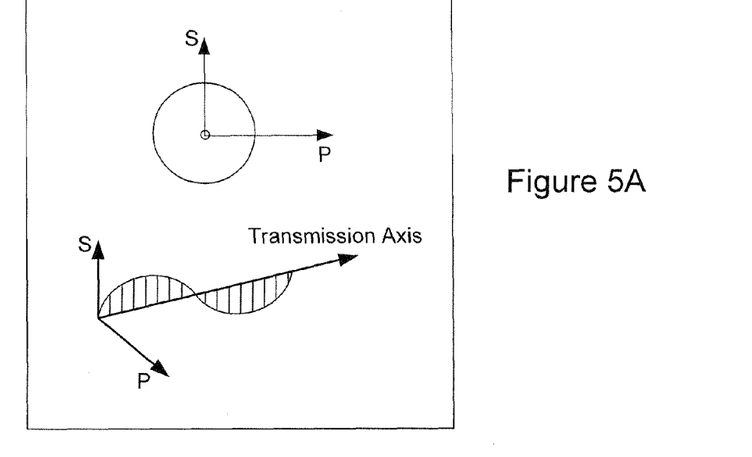
FIGS. 5A-5C are graphs that illustrate the concepts of slow and fast light axes, polarization states, and rotated polarization.
Figure 5B:
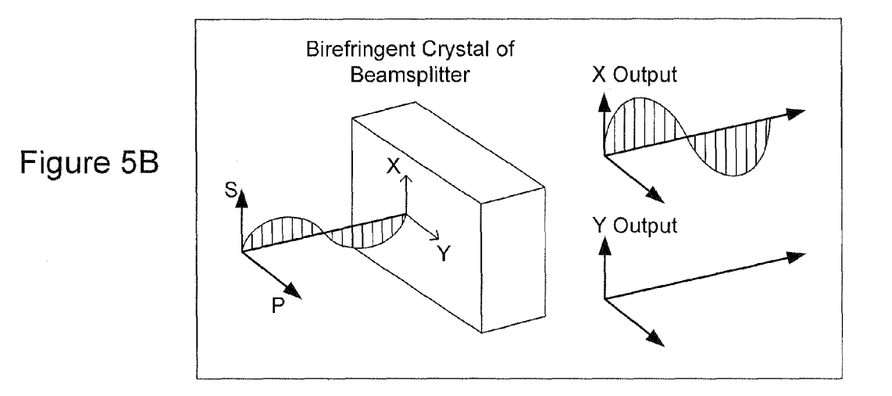
Figure 5C:
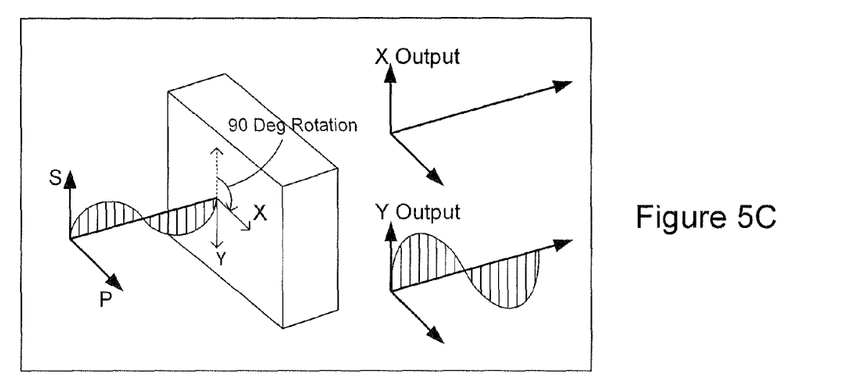

FIGS. 5A-5C are graphs that illustrate the concepts of slow and fast light axes, polarization states, and rotated polarization. FIG. 5A shows that the states of polarization in an optical fiber are arbitrary. It is helpful to establish a set of perpendicular axes to describe linear polarized light. In this case, two axes are established S (Slow) and P (Fast). Depicted in FIG. 5A is linear-polarized light being transmitted along the S axis. No light is transmitted along the P axis of the fiber. In FIG. 5B, linear-polarized light aligned with the S axis of the optical fiber is incident on a birefringent crystal of a polarization beam splitter. The beam splitter is aligned so that its X (parallel) axis is aligned with the S transmission axis of the optical fiber. All light is transmitted to the X output of the beam splitter, and no light is translated to the Y (parallel) output. In FIG. 5C, the beam splitter is rotated 90 degrees so that its X axis aligns with the P axis of the fiber. No light is transmitted along the P axis of the fiber, and no light is observed on X output of the beam splitter. The linear-polarized light in alignment with the S axis of the optical fiber is now aligned with the Y axis of the crystal, and all light is observed on the Y output.

Figure 6:
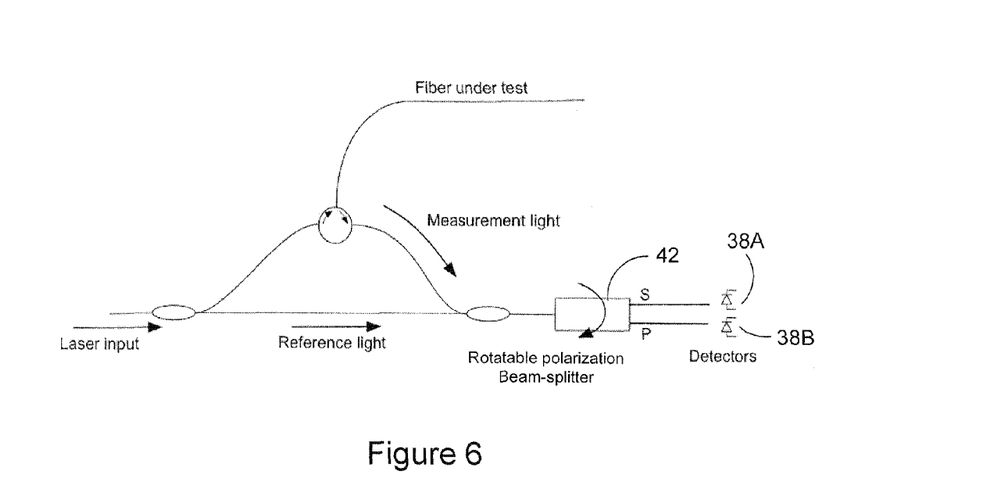
FIG. 6 shows an example rotatable beam splitter used in an optical network to achieve polarization control.

FIG. 6 shows an example rotatable beam splitter used in an optical network to achieve polarization control. The example network includes an interferometer connected to a rotatable polarization beam splitter 42. Again, by rotating the rotatable beam splitter 42 by any suitable means, the optical power traveling to the S and P polarization output fibers coupled here to S and P photodetectors 38A and 38B can be changed.

Another advantage of this new polarization rotation scheme is that it can be implemented in compact fashion. For example, in a manual rotation implementation, little if any additional structure is needed for a human to rotate the beam splitter. Automated rotation implementations can also be very small in size. Consider a micro gear motor assembly implementation such as the example shown in FIG. 7. The fiber 12 leading into the beam splitter 50 may be a standard single mode fiber so that the polarization state of the light does not follow the fiber birefringence axes as the beam splitter 50 is rotated. The beam splitter 50, however, separates the polarization states into parallel and perpendicular output fibers S and P depending on how the incoming beam is incident on the structure.

Figure 7:
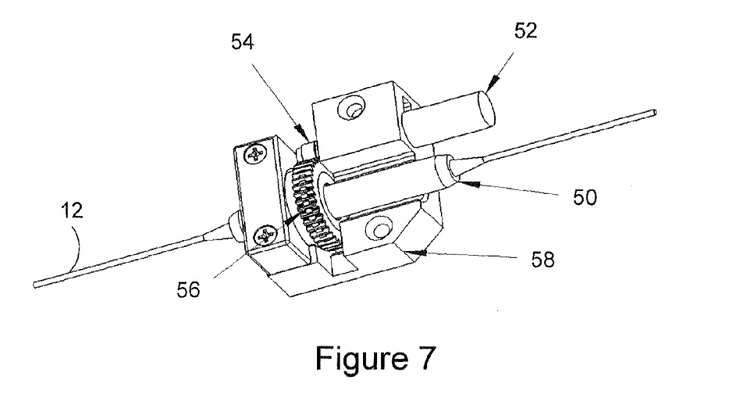
FIG. 7 shows an example rotatable beam splitter implemented using a motor assembly.

A micro motor connected to a micro planetary gearbox is shown at 52, which in turn is coupled to the rotatable beam splitter 50 via a small spur gear set. The rotatable beam splitter 50 is mounted in a spur gear 56 that meshes with a spur gear 54 mounted on the micro planetary gearbox 52. The assembly is supported with a compact, low profile housing 58. Ninety degrees of rotation of the beam splitter 50 is needed to translate through the maxima for both S and P polarizations.

An additional practical concern relates to limiting rotation of the beam splitter 50. Without a limit on rotation, the rotated beam splitter can potentially wind up the fiber and damage the fiber network. Accordingly, mechanical features may be added that limit the rotation of the beam splitter, e.g., to less than one revolution. One way to do that is to use one or more mechanical stops coupled to the rotating beam splitter. The mechanical stop or stops are arranged with a stationary portion of the structure in a fashion to stop rotation in that direction. The motor controller monitors the current draw of the motor during operation. The controller may halt operation when the current drawn by the motor increases or increases by more than a predetermined amount, e.g., identifying that the end of desired rotation is reached. The power levels on the two polarization states may also be monitored, and if those power levels stop changing relative to each other, then the controller determines that the rotatable beam splitter 50 has reached an end of rotation. At this point, the motor controller only allows the motor to rotate in a direction away from the end of rotation.

Figure 9:
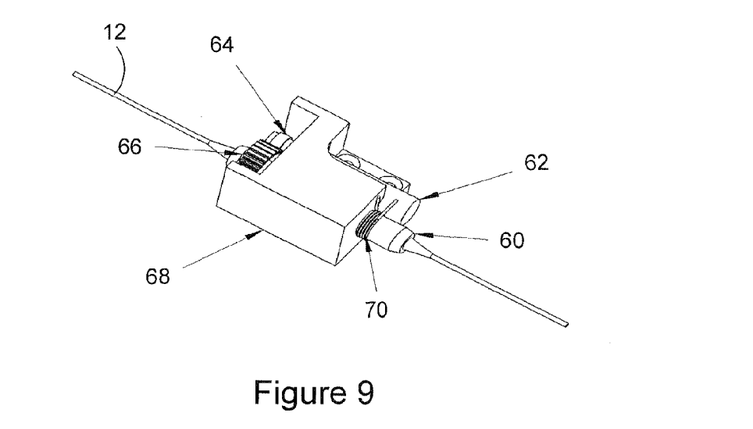
FIG. 9 shows an example rotatable beam splitter implemented using a motor assembly in accordance with the second embodiment.

The end of rotation stop may be made progressive through the use of a spring to minimize wear on components. Reference numeral 70 in FIG. 9 shows one example implementation of a progressive mechanical stop. In this example configuration, the mechanical stop is the end of the gear motor, and the progressive spring is a torsional spring mounted on the beam splitter housing. As the beam splitter rotates, one of the arms of the spring eventually contacts the exterior of the motor. As motion continues in that direction, the spring load increases, and therefore, the motor load and current increase. The progressive nature of this mechanical stop reduces shock on the system compared to a hard stop.

Figure 8:
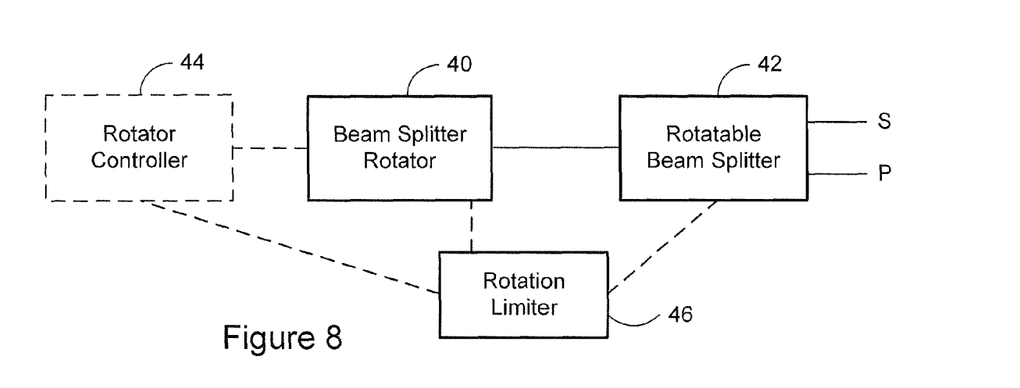
FIG. 8 shows a second example embodiment of an example rotatable beam splitter to achieve polarization control.

FIG. 8 shows a second example embodiment of an example rotatable beam splitter to achieve polarization control. As in FIG. 4, a beam splitter rotator 40 and rotatable beam splitter 42 are provided. If the beam splitter rotator 40 is automated in some fashion, then a rotator controller 44 controls operation of the beam splitter rotator 40. In addition, a rotation limiter 46 is shown associated by dashed lines to each of rotator controller 44, beam splitter rotator 40, and rotatable beam splitter 42 to indicate that the rotation limiter may be a stand alone component or that the rotation limitation operation may be performed by or as a part of any of the rotator controller 44, beam splitter rotator 40, and rotatable beam splitter 42.

FIG. 9 shows a non-limiting example rotatable beam splitter implemented using a motor assembly in accordance with the second embodiment. Here, a torsional spring 70 is used to limit rotation, e.g., to about 270 degrees. The components are similar to those described in FIG. 6. A rotatable beam splitter 60 is inserted through a housing 68 and includes an output gear 66 mounted on one end. The progressive end of rotation stop 70 also acts as a retainer to hold the rotatable beam splitter 60 in place. A micro gear motor 62 is used with a spur gear 64 mounted on the motor output shaft. The simple progressive end of rotation stop 70 reduces costs and simplifies wiring.

Figures 10A, 10B:
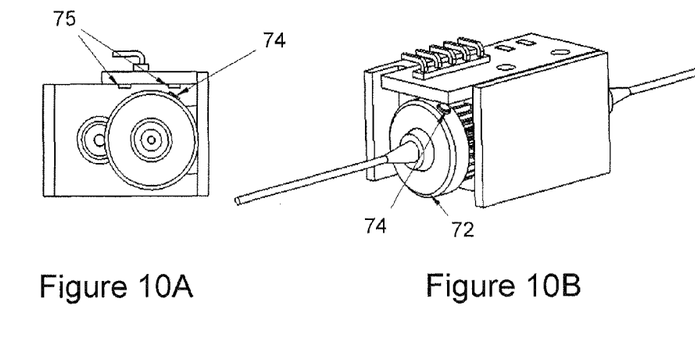
FIGS. 10A and 10B show another example rotatable beam splitter implemented using a motor assembly in accordance with the second embodiment.

FIGS. 10A (cross section) and 10B (perspective) show another example rotatable beam splitter implemented using a motor assembly in accordance with the second embodiment that makes use of hall sensors as limit switches. A magnet ring 72 is added to the beam splitter adjacent to the drive gear. This ring contains a magnet 74 that triggers one of two hall sensors 76 mounted on a small printed circuit board. FIG. 10A shows the assembly near one end of travel with the right hall sensor active. The assembly would rotate in the clockwise direction until the desired polarization state was reached or the left hall sensor was activated. This ring triggers one of two hall sensors that identify each end of travel. Although adding a few wires, this embodiment removes the need for a mechanical rotation limiter.

A non-backdriving example embodiment is advantageous because it insures that the system stays at the desired polarization output state. This can be done by use of inherently non-backdriving gear trains, such as worm gear drives, or through the use of high reduction ratios. Other gearbox configurations may be used. There may also be cases where the polarization state is desired to be dynamically changing. In this case, a non-backdriving solution will likely be less desirable due to the higher inherent wear of these drivetrains.

More generally, because the beam splitter is rotated rather than the fiber, the technology does not require low bend loss fiber, thereby eliminating one splice between low bend loss and standard fiber in most networks. Low bend loss fiber typically has a higher intrinsic loss per unit length than standard fiber, and so elimination of low bend loss fiber reduces optical loss. The technology is significantly less costly than paddle motor assemblies and only requires one degree of freedom to provide polarization rotation instead of two. Volumetrically the technology is significantly smaller than paddle motor assemblies. Thus, compared to conventional polarization rotation mechanisms, the technology described here is a robust, small size, and low cost alternative.

Figure 11:
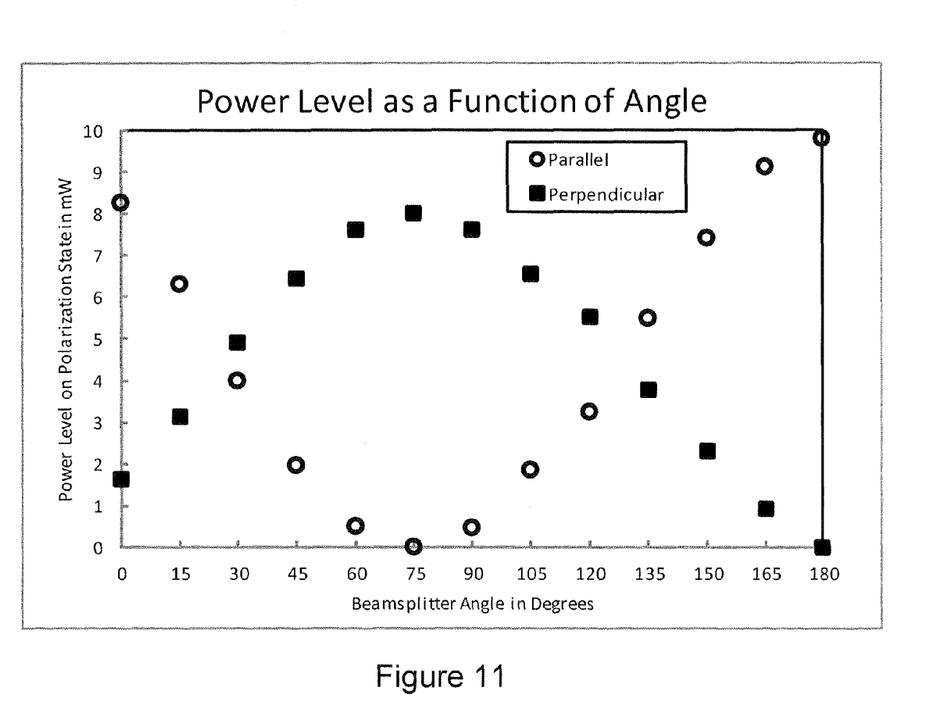
FIG. 11 is a graph illustrating power level of two polarization states versus beam splitter rotation angle for a non-limiting example test device.

Example and non-limiting tests were performed using a tunable laser coupled into the input of a polarizing beam splitter (PBS), and the two outputs were sent to detectors in a processing module. The PBS was fixed in a rotational stage, and power levels on the two output ports were monitored while the beam splitter was rotated with a constant power input. The power level of the two polarization states S and P varied from minimum to maximum 180 degrees out of phase as shown in FIG. 11. As may be seen in the graph, the variation in output power allows for power balancing between the two polarization states.

It is also example embodiment implements dynamic polarization control using a high speed rotational device. A device such as a voice coil, limited angle motor, or any limited angle rotational device (preferably a high speed device) may be used to oscillate the beam splitter in a dynamic fashion.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. An apparatus for separating polarization of light, comprising:
    a rotatable beam splitter including a birefringent crystal having an X axis perpendicular to a Y axis such that the rotatable beam splitter is rotatable to a first position to align the X axis with a parallel polarization and the Y axis with a perpendicular polarization and rotatable to a second position to align the Y axis with the parallel polarization and the X axis with the perpendicular polarization, an input fiber coupled to the birefringent crystal for receiving light with a first polarization, a first output fiber coupled to the birefringent crystal, for outputting light with a polarization different from the first polarization, and a second output fiber coupled to the birefringent crystal for outputting light with a polarization different from the first polarization, wherein rotation of the rotatable beam splitter changes a ratio of power of light coupled to the first output fiber and power of light coupled to the second output fiber.

2. The apparatus in claim 1, wherein the rotatable beam splitter is configured to be rotated manually.

3. The apparatus in claim 1, wherein the rotatable beam splitter is configured to be rotated automatically.

4. The apparatus in claim 3, further comprising:
a beam splitter rotator controller coupled to controllably rotate the rotatable beam splitter.

5. The apparatus in claim 3, wherein the rotatable beam splitter includes a gear assembly and an electric motor.

6. The apparatus in claim 1, wherein the rotatable beam splitter includes a rotation limiter.

7. The apparatus in claim 6, wherein the rotation limiter is configured to progressively stop rotation of the rotatable beam splitter.

8. The apparatus in claim 6, wherein the rotation limiter includes a spring.

9. The apparatus in claim 6, wherein the rotation limiter includes one or more limit switches.

10. The apparatus in claim 9, wherein the rotation limiter includes a magnet and one or more Hall effect sensors.

11. The apparatus in claim 1, wherein the rotatable beam splitter includes a gearbox assembly operable by an electric motor and a motor controller configured to control an amount of rotation of the rotatable beam splitter based on current drawn by the electric motor.

12. The apparatus in claim 1, wherein the rotatable beam splitter outputs light with two different polarization states, and wherein the rotatable beam splitter includes a gearbox assembly operable by an electric motor and a motor controller configured to detect motor power levels associated with power levels associated with the polarization states, the motor controller being further configured to control an amount of rotation of the rotatable beam splitter based on the detected power levels.

13. The apparatus in claim 1, wherein rotation of the rotatable beam splitter changes the first light polarization of the input light to different polarizations for the output light.

14. The apparatus in claim 1, wherein the polarization of light in the first output fiber is orthogonal to the polarization of light in the second output fiber.

15. An optical network, comprising:
an interferometer for mixing input light from a laser and light from a device or fiber under test and generating an interferometric light signal, and
a rotatable beam splitter including a birefringent crystal having an X axis perpendicular to a Y axis such that the rotatable beam splitter is rotatable to a first position to align the X axis with a parallel polarization and the Y axis with a perpendicular polarization and rotatable to a second position to align the Y axis with the parallel polarization and the X axis with the perpendicular polarization, an input fiber coupled to the birefringent crystal for receiving light with a first polarization, a first output fiber coupled to the birefringent crystal, for outputting light with a polarization different from the first polarization, and a second output fiber coupled to the birefringent crystal for outputting light with a polarization different from the first polarization,
wherein rotation of the rotatable beam splitter changes a ratio of power of light coupled to the first output fiber and power of light coupled to the second output fiber.

16. The optical network in claim 15, wherein the rotatable beam splitter is configured to perform a polarization rotation operation without using a paddle-based polarization controller.

17. The optical network in claim 15, wherein rotation of the rotatable beam splitter changes the first light polarization of the input light to different polarizations for the output light.

18. The optical network in claim 15, wherein the polarization of light in the first output fiber is orthogonal to the polarization of light in the second output fiber.

19. A method for controlling polarization of an input light signal with a first light polarization using a rotatable beam splitter including a birefringent crystal having an X axis perpendicular to a Y axis such that the rotatable beam splitter is rotatable to a first position to align the X axis with a parallel polarization and the Y axis with a perpendicular polarization and rotatable to a second position to align the Y axis with the parallel polarization and the X axis with the perpendicular polarization, an input fiber coupled to the birefringent crystal for receiving light with a first polarization, a first output fiber coupled to the birefringent crystal, for outputting light with a polarization different from the first polarization, and a second output fiber coupled to the birefringent crystal for outputting light with a polarization different from the first polarization, comprising:
rotating the rotatable beam splitter to cause polarization rotation to a second light polarization;
receiving the input light signal at an input fiber of the rotatable beam splitter; and
outputting from the rotatable beam splitter output light with the second light polarization to a first output fiber and a second output fiber,
wherein rotation of the rotatable beam splitter changes a ratio of power of light coupled to the first output fiber and power of light coupled to the second output fiber.

* * * * *